United States Patent
Zou et al.

(10) Patent No.: US 7,280,760 B1
(45) Date of Patent: Oct. 9, 2007

(54) UPGRADEABLE OPTICAL ADD/DROP MULTIPLEXER

(75) Inventors: Li Zou, Union City, CA (US); Giovanni Barbarossa, Saratoga, CA (US)

(73) Assignee: Avanex Corporation, Fremont, CA (US)

( * ) Notice: Subject to any disclaimer, the term of this patent is extended or adjusted under 35 U.S.C. 154(b) by 693 days.

(21) Appl. No.: 10/650,936

(22) Filed: Aug. 27, 2003

Related U.S. Application Data (60) Provisional application No. 60/407,191, filed on Aug. 28, 2002.

(51) Int. Cl.
- H04J 14/02 (2006.01)
- G02B 6/293 (2006.01)
- G02B 5/26 (2006.01)

(52) U.S. Cl. .................. 398/85; 398/82; 398/83; 398/88; 385/24; 385/27; 385/42; 385/47; 385/49

(58) Field of Classification Search ............ 398/82, 398/83, 85, 88; 385/47
See application file for complete search history.

(56) References Cited

U.S. PATENT DOCUMENTS

| | | | | |
|---|---|---|---|---|
| 5,943,149 A | * | 8/1999 | Cearns et al. ............ | 398/79 |
| 6,711,986 B2 | * | 3/2004 | Angione ................. | 92/187 |
| 6,744,986 B1 | * | 6/2004 | Vohra .................... | 398/83 |

\* cited by examiner

Primary Examiner—Jason Chan
Assistant Examiner—Danny Wai Lun Leung
(74) Attorney, Agent, or Firm—Patterson & Sheridan, LLP (57) ABSTRACT

An OADM includes optical input and output; first and second bandpass filters with a first pass band, optically coupled to the optical input and output, respectively; third and fourth bandpass filters with a second pass band, optically coupled to reflection ports of the first and second bandpass filters, respectively; first and second cascaded series of channel filter assemblies optically coupled to the transmission ports of the first and second bandpass filters, respectively, and third and fourth cascaded series of channel filter assemblies optically coupled to the transmission ports of the third and fourth bandpass filters, respectively. The OADM may be extended or upgraded so as to accommodate the throughput of additional channels or wavelengths by extending the number of filters within each cascaded series of bandpass filters, where the transmission ports of the additional bandpass filters are optically coupled to respective additional cascaded series of channel filter assemblies.

18 Claims, 4 Drawing Sheets

UPGRADEABLE OPTICAL ADD/DROP MULTIPLEXER

CROSS REFERENCE TO RELATED APPLICATION

This application is claiming under 35 USC 119(e) the benefit of provisional patent application Ser. No. 60/407,191 filed on Aug. 28, 2002.

FIELD OF THE INVENTION

The present invention relates to multiplexers for wavelength division multiplexed optical communications systems. More particularly, the present invention relates to multiplexers that can remove or drop a plurality of channels out of a large set of channels whilst simultaneously providing replacement channels comprising the same wavelength bands as the dropped channels and whose architecture can be readily modified to accommodate greater numbers of channels.

BACKGROUND OF THE INVENTION

The use of optical fiber for long-distance transmission of voice and/or data is now common. As the demand for data carrying capacity continues to increase, there is a continuing need to utilize the bandwidth of existing fiber-optic cable more efficiently. An established method for increasing the carrying capacity of existing fiber cable is Wavelength Division Multiplexing (WDM) in which multiple information channels are independently transmitted over the same fiber using multiple wavelengths of light. In this practice, each light-wave-propagated information channel corresponds to light within a specific wavelength range.

In this specification, these individual information-carrying lights of a WDM optical fiber, optical line or optical system are referred to as either "signals" or "channels." The totality of multiple combined signals, wherein each signal is of a different wavelength range, is herein referred to as a "composite optical signal." Although each information-carrying channel actually comprises light of a certain range of physical wavelengths, for simplicity, a single channel is referred to as a single wavelength, λ, and a plurality of n such channels are referred to as "n wavelengths" denoted $\lambda_1$-$\lambda_n$. The symbols $\lambda_i$, $\lambda'_i$ distinguish between channels having the same particular physical wavelength or wavelength range, but possibly carrying different information content.

Conventional OADM systems can separate a composite optical signal into its component channels, remove or "drop" certain selected channels, replace or "add" new channels comprising the same wavelengths as the dropped channels, and re-combine the added channels together with the non-dropped channels into a new composite optical signal. Unfortunately, in conventional OADM systems, which utilize optical filters, a high insertion loss can occur in the separation or "de-multiplexing" stage and the combination or "multiplexing" stage. Each filter has a certain associated insertion loss. The overall insertion loss (in logarithmic units) is the summation of the individual insertion losses associated with each component. Therefore, insertion losses increase for channels encountering more optical components. The losses are greatest for the last channel separated and the first channel added. The losses can become prohibitively large if the optical system employing such an OADM is upgraded so as to include additional channels.

Accordingly, what is needed is an improved upgradeable OADM system. The system should be easily modified or upgraded to accommodate additional channels and should not cause prohibitively large signal losses as a result of such upgrading. The present invention addresses such a need.

SUMMARY OF THE INVENTION

The present invention provides an upgradeable Optical Add/Drop Multiplexer (upgradeable OADM). An upgradeable OADM in accordance with the present invention comprises an optical input; an optical output; a first and a second bandpass filter, both comprising a first pass band, optically coupled to the optical input and the optical output, respectively; a third and a fourth bandpass filter, both comprising a second pass band, optically coupled to reflection ports of the first and second bandpass filters, respectively; a first and a second cascaded series of channel filter assemblies optically coupled to the transmission ports of the first and second bandpass filters, respectively, a third and a fourth cascaded series of channel filter assemblies optically coupled to the transmission ports of the third and fourth bandpass filters, respectively, and, optionally, an optical switching unit optically coupled between the cascaded series of channel filter assemblies optically coupled to the first and third bandpass filters and the cascaded series of channel filter assemblies optically coupled to the second and fourth bandpass filters.

The first bandpass filter, first cascaded series of channel filter assemblies, third bandpass filter and third cascaded series of channel filter assemblies comprise a de-multiplexer section of the upgradeable OADM. The first bandpass filter separates an input set of channels into a first subset of channels transmitted to the first cascaded series of channel filter assemblies and a second subset of channels reflected to the third bandpass filter. Each channel filter assembly within the first cascaded series transmits only one channel of the first subset of channels and reflects other channels, thereby de-multiplexing the first subset of channels. The third bandpass filter separates the second subset of channels into a third subset of channels transmitted to the third cascaded series of channel filter assemblies and a fourth subset of channels reflected from the third bandpass filter. Each channel filter assembly within the third cascaded series transmits only one channel of the third subset of channels and reflects other channels, thereby de-multiplexing the third subset of channels.

The second bandpass filter, second cascaded series of channel filter assemblies, fourth bandpass filter and fourth cascaded series of channel filter assemblies comprise a multiplexer section of the upgradeable OADM. Optical signals passing through the second bandpass filter, fourth bandpass filter, second cascaded series of channel filter assemblies and fourth series of channel filter assemblies propagate oppositely to optical signal propagation within the first bandpass filter, third bandpass filter, first cascaded series of channel filter assemblies and third cascaded series of channel filter assemblies, respectively. The multiplexer section therefore combines separate optical channels into a single composite optical signal that exits the apparatus at the optical output.

The first and third bandpass filters comprise a first cascaded series of bandpass filters. The second and fourth bandpass filters comprise a second cascaded series of bandpass filters. An OADM in accordance with the present invention may be readily upgraded so as to de-multiplex and multiplex additional channels. Such upgrading may be accomplished by optically coupling an additional bandpass filter to the reflection port of the last bandpass filter in the first cascaded series of bandpass filters and optically coupling another additional bandpass filter to the reflection port of the first bandpass filter in the second cascaded series of bandpass filters, wherein the transmission ports of the additional bandpass filters are optically coupled to respective additional cascaded series of channel filter assemblies.

Exemplary embodiments of the present invention may use one or more of the aspects described above, alone, or in combination.

DETAILED DESCRIPTION

The present invention provides an upgradeable Optical Add/Drop Multiplexer (OADM) for use within optical communications networks. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

To more particularly describe the features of the present invention, please refer to FIGS. 1 through 4 in conjunction with the discussion below.

The present invention provides an upgradeable Optical Add/Drop Multiplexer (OADM) for use within optical communications networks. The following description is presented to enable one ordinary skill in the art to make and use the invention and is provided in the context of a patent application and its requirements. Various modifications to the preferred embodiments will be readily apparent to those skilled in the art and the generic principles described herein may be applied to other embodiments. Thus, the present invention is not intended to be limited to the embodiments shown but is to be accorded the widest scope consistent with the principles and features described herein. In order to gain a detailed understanding of the construction and operation of the Programmable OADM of the present invention, the reader is referred to the appended FIGS. 1-4 in conjunction with the following description.

Figure 1:
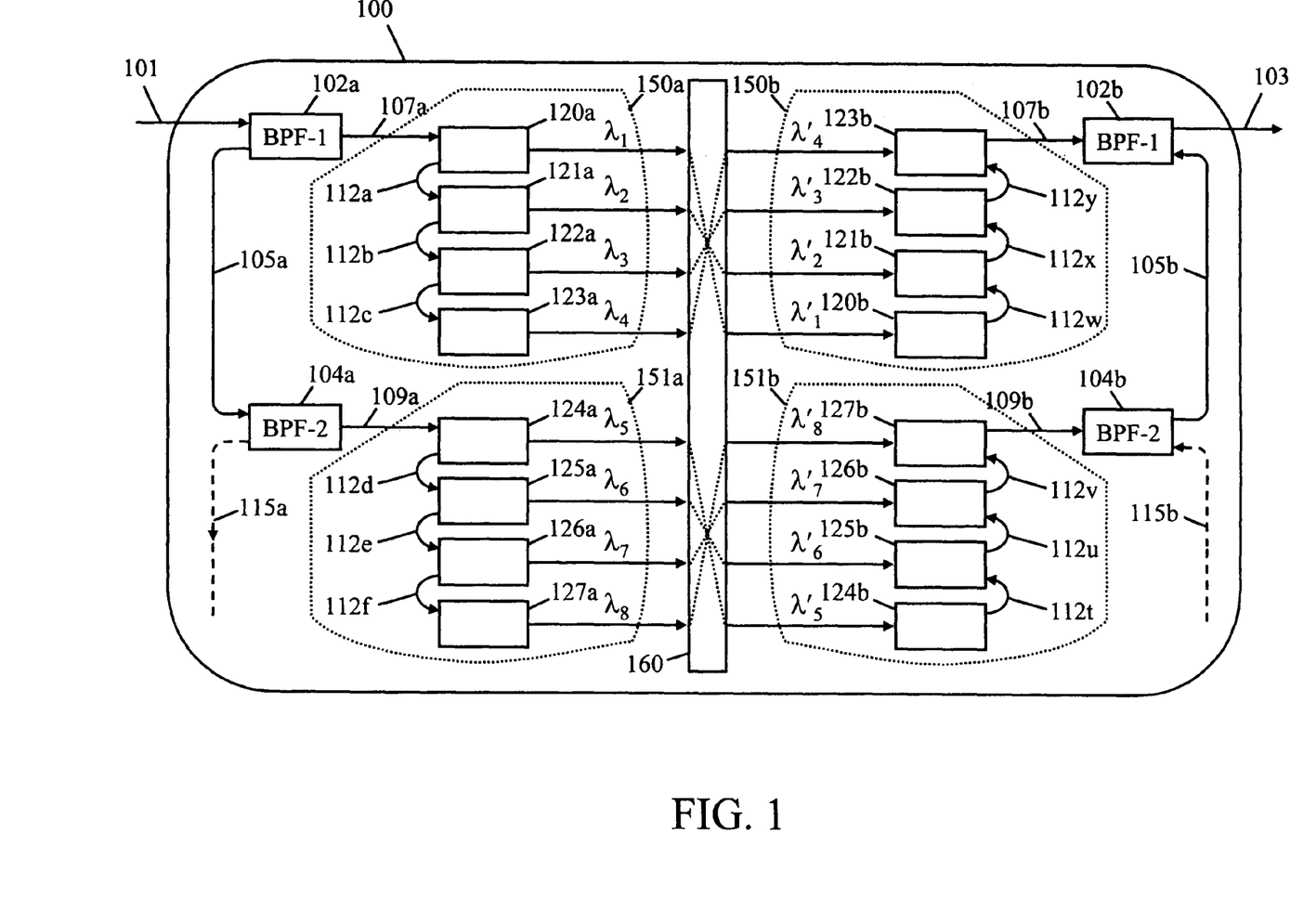
FIG. 1 illustrates a first preferred embodiment of an OADM in accordance with the present invention.

FIG. 1 illustrates a first preferred embodiment of an upgradeable OADM in accordance with the present invention. The OADM 100 shown in FIG. 1 comprises an input 101 and an output 103. The input 101 directs a composite optical signal comprising, in this example, the eight channels $\lambda_1$-$\lambda_8$ into the OADM 100 and the output 103 carries an eight-channel composite optical signal out of the apparatus 100, wherein the output composite optical signal comprises the same wavelengths (but not necessarily the same information content) as the channels $\lambda_1$-$\lambda_8$.

The input 101 of the OADM 100 is optically coupled to a first bandpass filter 102a, which is of a first type (i.e., type BPF-1). The output 103 of the OADM 100 is optically coupled to a second bandpass filter 102b, which is also of the first type BPF-1. The bandpass filter 102a comprises a reflection port 105a and a transmission port 107a. The first type, BPF-1, of bandpass filter transmits or passes therethrough the channels $\lambda_1$-$\lambda_4$ to a transmission port and reflects the other channels $\lambda_5$-$\lambda_8$ to a reflection port, thereby separating the channels $\lambda_1$-$\lambda_4$ from the channels $\lambda_5$-$\lambda_8$. Therefore, the reflection port 105a of the bandpass filter 102a carries the reflected channels $\lambda_5$-$\lambda_8$ away from the bandpass filter 102a whilst the transmission port 107a of the bandpass filter 102a carries the transmitted channels $\lambda_1$-$\lambda_4$ away from the bandpass filter 102a.

The transmission port 107a of the bandpass filter 102a is optically coupled to a channel filter assembly 120a. The channel filter assembly 120a comprises the first in a first cascaded series 150a of channel filter assemblies 120a, 121a, 122a, 123a. The channel filter assembly 120a transmits or passes therethrough the first channel $\lambda_1$ whilst reflecting other channels. The channel filter assembly 121a transmits or passes therethrough the second channel $\lambda_2$ whilst reflecting other channels. The channel filter assembly 122a transmits or passes therethrough the third channel $\lambda_3$ whilst reflecting other channels. The channel filter assembly 123a transmits or passes therethrough the fourth channel $\lambda_4$ whilst reflecting other channels.

The cascaded series 150a of optically coupled channel filter assemblies serves to separate the four channels $\lambda_1$, $\lambda_2$, $\lambda_3$ and $\lambda_4$ to respective unique pathways with low insertion losses for all channels. The channel filter assembly 120a receives the four channels $\lambda_1$-$\lambda_4$ plus any spurious wavelengths from the transmission port 107a and transmits or passes therethrough only the channel $\lambda_1$. The remaining channels $\lambda_2$-$\lambda_4$ and any spurious wavelengths are reflected to the optical coupling 112a whereby they are carried to the channel filter assembly 121a. The channel filter assembly 121a receives the three channels $\lambda_2$-$\lambda_4$ plus any spurious wavelengths and transmits or passes therethrough only the channel $\lambda_2$. The remaining two channels $\lambda_3$-$\lambda_4$ and any spurious wavelengths are reflected to another optical coupling 112b whereby they are carried to the channel filter assembly 122a. The channel filter assembly 122a receives the two channels $\lambda_3$-$\lambda_4$ plus any spurious wavelengths and transmits or passes therethrough only the channel $\lambda_3$. The remaining channel $\lambda_4$ and any spurious wavelengths are reflected to another optical coupling 112c whereby they are carried to the channel filter assembly 123a. The channel filter assembly 123a receives the channel $\lambda_4$ plus any spurious wavelengths and transmits or passes therethrough only the channel $\lambda_4$. The spurious wavelengths, if present, are reflected from the channel filter assembly 123a and thereby lost from the system, so as not to contaminate any of the channels.

The reflection port 105a of the first bandpass filter 102a carries the channels $\lambda_5$-$\lambda_8$. This reflection port 105a is optically coupled to a third bandpass filter 104a, which is of a second type (i.e., type BPF-2). The bandpass filter 104a comprises a reflection port 115a and a transmission port 109a. The second type, BPF-2, of bandpass filter transmits or passes therethrough the channels $\lambda_5$-$\lambda_8$ to a transmission port and reflects other channels to a reflection port. Therefore, the transmission port 109a carries the channels $\lambda_5$-$\lambda_8$ whilst the reflection port 115a carries any remaining channels or wavelengths. The reflection port 115a of the bandpass filter 104a is not optically coupled to any other components within the OADM 100 and serves to carry the remaining channels or wavelengths out of the apparatus 100 so that they do not contaminate any of the channels $\lambda_1$-$\lambda_8$. As discussed in greater detail in the following discussion, the reflection port 115a may be utilized to upgrade an OADM in accordance with the present invention so as to accommodate additional channels.

The transmission port 109a of the bandpass filter 104a is optically coupled to a channel filter assembly 124a. The channel filter assembly 124a comprises the first in another cascaded series 151a of channel filter assemblies 124a, 125a, 126a, 127a. The channel filter assembly 124a transmits or passes therethrough the fifth channel $\lambda_5$ whilst reflecting other channels. The channel filter assembly 125a transmits or passes therethrough the sixth channel $\lambda_6$ whilst reflecting other channels. The channel filter assembly 126a transmits or passes therethrough the seventh channel $\lambda_7$ whilst reflecting other channels. The channel filter assembly 127a transmits or passes therethrough the eighth channel $\lambda_8$ whilst reflecting other channels.

The cascaded series 151a of optically coupled channel filter assemblies serves to separate the four channels $\lambda_5$, $\lambda_6$, $\lambda_7$ and $\lambda_8$ to respective unique pathways with low insertion losses for all channels. The channel filter assembly 124a receives the four channels $\lambda_5$-$\lambda_8$ plus any spurious wavelengths from the transmission port 109a and transmits or passes therethrough only the channel $\lambda_5$. The three channels $\lambda_6$-$\lambda_8$ and any spurious wavelengths are reflected to an optical coupling 112d whereby they are carried to the channel filter assembly 125a. The channel filter assembly 125a receives the three channels $\lambda_6$-$\lambda_8$ plus any spurious wavelengths and transmits or passes therethrough only the channel $\lambda_6$. The two channels $\lambda_7$-$\lambda_8$ and any spurious wavelengths are reflected to another optical coupling 112e whereby they are carried to the channel filter assembly 126a. The channel filter assembly 126a receives the two channels $\lambda_7$-$\lambda_8$ plus any spurious wavelengths and transmits or passes therethrough only the channel $\lambda_7$. The channel $\lambda_8$ and any spurious wavelengths are reflected to another optical coupling 112f whereby they are carried to the channel filter assembly 127a. The channel filter assembly 127a receives the channel $\lambda_8$ plus any spurious wavelengths and transmits or passes therethrough only the channel $\lambda_8$. The spurious wavelengths, if present, are reflected from the channel filter assembly 127a and thereby lost from the apparatus 100. The bandpass filter 102a, cascaded series 150a of channel filter assemblies, bandpass filter 104a, cascaded series 151a of channel filter assemblies and their associated ports and optical couplings together comprise a de-multiplexer section of the upgradeable OADM 100.

The second bandpass filter 102b comprises a reflection port 105b and a transmission port 107b. The bandpass filter 102b operates similarly to the bandpass filter 102a except that optical signals traverse through the transmission and reflection ports in directions that are opposite to the directions of signals traversing through respective corresponding ports of the bandpass filter 102a. Therefore, the reflection port 105b of the bandpass filter 102b delivers the channels $\lambda'_5$-$\lambda'_8$ to the bandpass filter 102b whilst the transmission port 107b delivers the channels $\lambda'_1$-$\lambda'_4$ to the bandpass filter 102b. The bandpass filter 102b transmits the channels $\lambda'_1$-$\lambda'_4$ through to the output 103 and also reflects the channels $\lambda'_5$-$\lambda'_8$ to the output 103 thereby combining the channels $\lambda'_1$-$\lambda'_4$ with the channels $\lambda'_5$-$\lambda'_8$.

The transmission port 107b of the bandpass filter 102b is optically coupled to a channel filter assembly 123b. The channel filter assembly 123b comprises the last in a cascaded series 150b of channel filter assemblies 120b, 121b, 122b, 123b. The channel filter assembly 120b transmits or passes therethrough the first channel $\lambda'_1$ whilst reflecting other channels. The channel filter assembly 121b transmits or passes therethrough the second channel $\lambda'_2$ whilst reflecting other channels. The channel filter assembly 122b transmits or passes therethrough the third channel $\lambda'_3$ whilst reflecting other channels. The channel filter assembly 123b transmits or passes therethrough the fourth channel $\lambda'_4$ whilst reflecting other channels.

The cascaded series 150b of optically coupled channel filter assemblies, comprising channel filter assemblies 120b, 121b, 122b and 123b, operates similarly to the series 150a except that optical signals traverse through the channel filter assemblies 120b, 121b, 122b and 123b oppositely to the directions of signals traversing through the channel filter assemblies 120a, 121a, 122a and 123a, respectively. The cascaded series 150b of optically coupled channel filter assemblies therefore serves to combine the channels $\lambda'_1$, $\lambda'_2$, $\lambda'_3$ and $\lambda'_4$, received from different respective pathways, onto a common pathway.

The channel filter assembly 120b receives the channel $\lambda'_1$ and transmits or passes the channel $\lambda'_1$ therethrough to an optical coupling 112w. Any spurious wavelengths that may be delivered to the channel filter assembly 120b along the same pathway as the channel $\lambda'_1$ are not transmitted through the channel filter assembly 120b to the optical coupling 112w. The channel filter assembly 121b receives the channel $\lambda'_1$ from the optical coupling 112w and reflects this channel $\lambda'_1$ to another optical coupling 112x. The channel filter assembly 121b also receives the channel $\lambda'_2$ and transmits or passes the channel $\lambda'_2$ therethrough to the optical coupling 112x. Any spurious wavelengths that may be delivered to the channel filter assembly 121b along the same pathway as channel $\lambda'_2$ are not transmitted through the channel filter assembly 121b to the optical coupling 112x.

The channel filter assembly 122b receives the channels $\lambda'_1$ and $\lambda'_2$ from the optical coupling 112x and reflects these two channels to another optical coupling 112y. The channel filter assembly 122b also receives the channel $\lambda'_3$ and transmits or passes the channel $\lambda'_3$ therethrough to the optical coupling 112y. Any spurious wavelengths that may be delivered to the channel filter assembly 122b along the same pathway as channel $\lambda_3$ are not transmitted through the channel filter assembly 122b to the optical coupling 112y.

The channel filter assembly 123b receives the channels $\lambda'_1$, $\lambda'_2$ and $\lambda'_3$ from the optical coupling 112y and reflects these three channels to the transmission port 107b of the bandpass filter 102b. The channel filter assembly 123b also receives the channel $\lambda'_4$ and transmits or passes the channel $\lambda_4$ therethrough to the transmission port 107b. Any spurious wavelengths that may be delivered to the channel filter assembly 123b along the same pathway as channel $\lambda_4$ are not transmitted through the channel filter assembly 123b to the transmission port 107b.

The reflection port 105b of the bandpass filter 102b carries the channels $\lambda'_5$-$\lambda'_8$ to the bandpass filter 102b. This reflection port 105b is optically coupled to and receives the channels $\lambda'_5$-$\lambda'_8$ from a fourth bandpass filter 104b, which is of the second type, BPF-2. The bandpass filter 104b comprises a reflection port 115b and a transmission port 109b. The bandpass filter 104b transmits or passes therethrough only the channels $\lambda'_5$-$\lambda'_8$ and reflects other channels or wavelengths. The reflection port 115b of the bandpass filter 104b is not optically coupled to any other components within the OADM 100 shown in FIG. 1, but may be utilized when the OADM is upgraded to accommodate additional channels.

The transmission port 109b of the bandpass filter 104b is optically coupled to a channel filter assembly 127b. The channel filter assembly 127b comprises the last in a cascaded series 151b of channel filter assemblies 124b, 125b, 126b, 127b. The channel filter assembly 124b transmits or passes therethrough the fifth channel $\lambda'_5$ whilst reflecting other channels. The channel filter assembly 125b transmits or passes therethrough the sixth channel $\lambda'_6$ whilst reflecting other channels. The channel filter assembly 126b transmits or passes therethrough the seventh channel $\lambda'_7$ whilst reflecting other channels. The channel filter assembly 127b transmits or passes therethrough the eighth channel $\lambda'_8$ whilst reflecting other channels.

The cascaded series 151b of channel filter assemblies, comprising the channel filter assemblies 124b, 125b, 126b and 127b, operates similarly to the series 151a except that optical signals traverse through the channel filter assemblies 124b, 125b, 126b and 127b oppositely to the directions of signals traversing through the channel filter assemblies 124a, 125a, 126a and 127a, respectively. The cascaded series 151b of optically coupled channel filter assemblies therefore serves to combine the channels $\lambda'_5$, $\lambda'_6$, $\lambda'_7$ and $\lambda'_8$, received from different respective pathways, onto a common pathway.

The channel filter assembly 124b receives the channel $\lambda'_5$ and transmits or passes the channel $\lambda'_5$ therethrough to an optical coupling 112t. Any spurious wavelengths that may be delivered to the channel filter assembly 124b along the same pathway as channel $\lambda'_5$ are not transmitted through the channel filter assembly 124b to the optical coupling 112t.

The channel filter assembly 125b receives the channel $\lambda'_5$ from the optical coupling 112t and reflects this channel $\lambda'_5$ to another optical coupling 112u. The channel filter assembly 125b also receives the channel $\lambda'_6$ and transmits or passes the channel $\lambda'_6$ therethrough to the optical coupling 112u. Any spurious wavelengths that may be delivered to the channel filter assembly 125b along the same pathway as channel $\lambda'_6$ are not transmitted through the channel filter assembly 125b to the optical coupling 1112u.

The channel filter assembly 126b receives the channels $\lambda_5$ and $\lambda'_6$ from the optical coupling 112u and reflects these two channels to another optical coupling 112v. The channel filter assembly 126b also receives the channel $\lambda_7$ and transmits or passes the channel $\lambda_7$ therethrough to the optical coupling 112v. Any spurious wavelengths that may be delivered to the channel filter assembly 126b along the same pathway as channel $\lambda_7$ are not transmitted through the channel filter assembly 126b to the optical coupling 112v.

The channel filter assembly 127b receives the channels $\lambda'_5$, $\lambda'_6$ and $\lambda'_7$ from the optical coupling 112v and reflects these three channels to the transmission port 109b of the bandpass filter 104b. The channel filter assembly 127b also receives the channel $\lambda'_8$ and transmits or passes the channel $\lambda'_8$ therethrough to the transmission port 109b. Any spurious wavelengths that may be delivered to the channel filter assembly 127b along the same pathway as channel $\lambda'_8$ are not transmitted through the channel filter assembly 127b to the transmission port 109b. The bandpass filter 102b, cascaded series 150b of channel filter assemblies, bandpass filter 104b, cascaded series 151b of channel filter assemblies and their associated ports and optical couplings together comprise a multiplexer section of the upgradeable OADM 100.

The aforementioned optical couplings 112a-f and 112t-v may comprise any form of waveguide optical coupling, such as optical fibers or planar waveguides, or free-space optical couplings. The optical couplings, whether in waveguide or free-space forms, may also include lenses, mirrors or other bulk or micro-optical components required to direct the channels to their intended destinations and/or condition the light comprising the channels. For instance, the optical couplings may comprise optical fibers together with associated lenses to focus channels into the fibers and/or to collimate channels emanating from the fibers. Many such optical couplings will be readily apparent to one of ordinary skill in the art.

Optionally, an optical switching unit or switching matrix 160 is optically coupled between the two cascaded series 150a, 151a and the two cascaded series 150b, 151 b. The optical switching unit 160 serves to receive the separated channels $\lambda_1$-$\lambda_8$ from the channel filter assemblies 120a, 121a, 122a, 123a, 124a, 125a, 126a, 127a; to route each of the channels either to a local drop port or receiver (not shown) or else back to one of the remaining channel filter assemblies 120b, 121b, 122b, 123b, 124b, 125b, 126b, 127b and to receive or else provide replacement channels comprising the same wavelengths as the dropped channels. The optical switching unit 160 may comprise one or more optical switches comprising any one of several well-known types. The optical switching unit 160 may also comprise one or more photodetectors or receivers to convert the received optical signals into electrical signals. The optical switching unit 160 may also comprise one or more transmitters or light emitting devices to provide the new optical signals that replace the dropped signals. Alternatively, instead of or in addition to transmitters or light emitting devices, the optical switching unit 160 may comprise one or more add ports (not shown) from which it receives one or more of the channels $\lambda'_1$-$\lambda'_8$ from external sources. In the context of this discussion, it is to be noted that the general channel $\lambda'_i$ may denote a replacement channel with the same wavelength as but different information payload from a dropped channel $\lambda_i$ or else may comprise the same information payload as the channel $\lambda_i$, in case this channel is not dropped but simply routed through the OADM apparatus.

Figure 2:
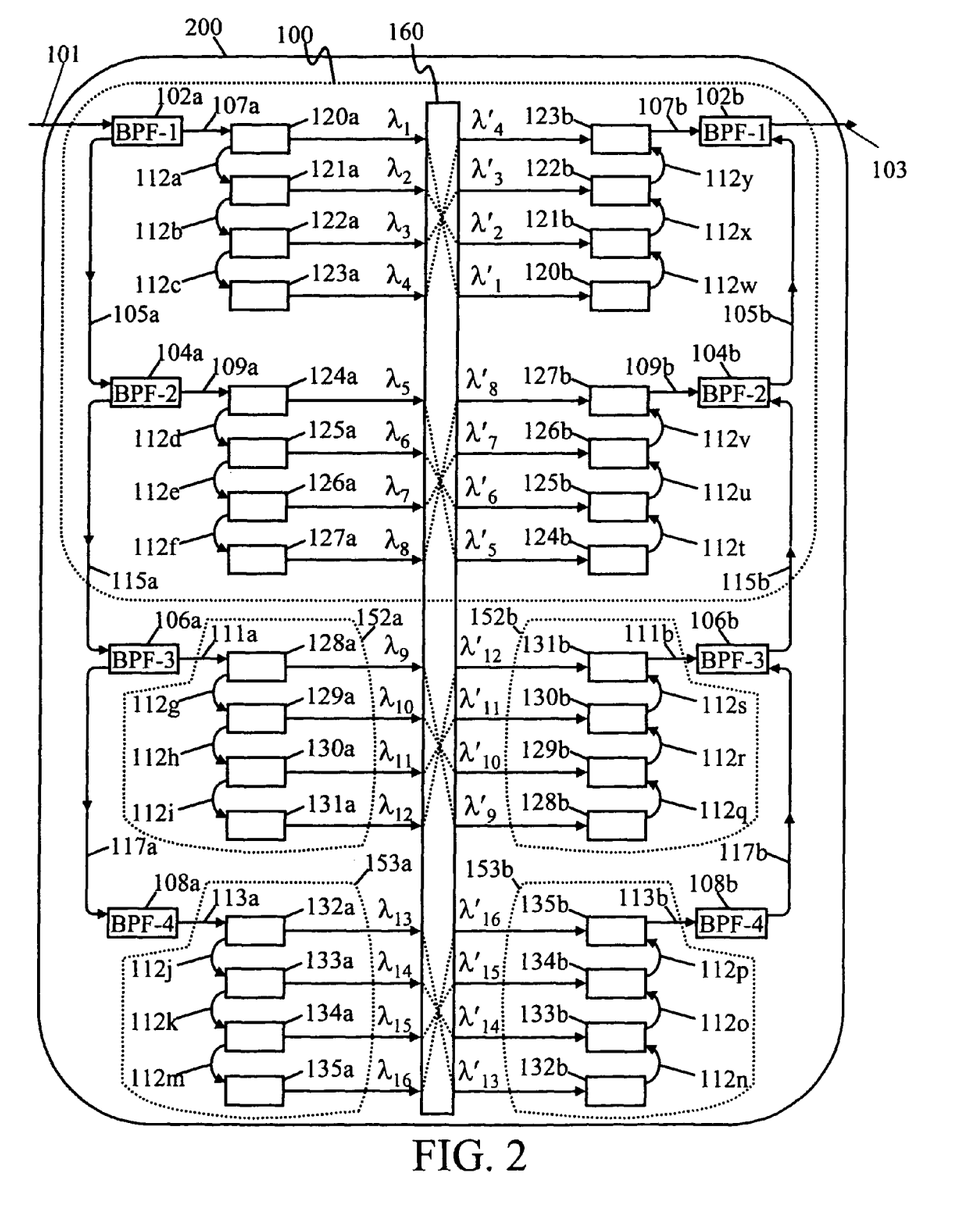
FIG. 2 illustrates a second preferred embodiment of an OADM in accordance with the present invention.

Within the OADM 100, the first bandpass filter 102a and the third bandpass filter 104a comprise a cascaded series of bandpass filters. Also, the second bandpass filter 102b and the fourth bandpass filter 104b comprise a second cascaded series of bandpass filters. The transmission port of each bandpass filter is optically coupled to a unique respective cascaded series of channel filter assemblies as previously described. The OADM 100 may be extended or upgraded so as to accommodate the throughput of additional channels or wavelengths by extending the number of filters within each cascaded series of bandpass filters. To illustrate this upgrade capability, FIG. 2 shows a second preferred embodiment of an OADM in accordance with the present invention. The OADM 200 shown in FIG. 2 comprises an extended version of the OADM 100. In other words, the OADM 100 comprises a component of the OADM 200, as shown in FIG. 2. However, the OADM 200 is configured so as to add and drop channels $\lambda'_9$-$\lambda'_{16}$ (or channels $\lambda'_9$-$\lambda'_{16}$) in addition to the channels $\lambda_1$-$\lambda_8$.

Within the OADM 200 (FIG. 2), the reflection port 115a, which carries the channels $\lambda_9$-$\lambda_{16}$ from the bandpass filter 104a, is optically coupled to a fifth bandpass filter 106a, which is of a third type, BPF-3. Furthermore, the reflection port 115b, which carries the channels $\lambda'_9$-$\lambda'_{16}$ to the bandpass filter 104b, is optically coupled to a sixth bandpass filter 106b, which is also of the third type. The bandpass filter 106a comprises a transmission port 117a optically coupled to a channel filter assembly 128a and a reflection port 117a optically coupled to a seventh bandpass filter 108a, which is of a fourth type, BPF-4. The bandpass filter 106b comprises a transmission port 111b optically coupled to a channel filter assembly 131b and a reflection port 117b optically coupled to an eighth bandpass filter 108b, which is of the fourth type.

The bandpass filters 106a-106b (BPF-3) transmit or pass therethrough the channels $\lambda_9$-$\lambda_{12}$ (or $\lambda'_9$-$\lambda'_{12}$) and reflect other channels or wavelengths. Therefore, the channels $\lambda_9$-$\lambda_6$, which are received at the bandpass filter 106a from the reflection port 115a are separated into the channels $\lambda_9$-$\lambda_2$, which are directed to the transmission port 111a and the channels $\lambda_{13}$-$\lambda_{16}$, which are directed to the reflection port 117a. Furthermore, the bandpass filter 106b receives the channels $\lambda'_9$-$\lambda'_{12}$ from the transmission port 111b and receives the channels $\lambda'_{13}$-$\lambda'_{16}$ from the reflection port 117b and combines these channels such that all the channels $\lambda'_9$-$\lambda'_{16}$ are delivered to the reflection port 115b.

The bandpass filters 108a-108b (BPF-4) transmit or pass therethrough the channels $\lambda_{13}$-$\lambda_{16}$ (or $\lambda'_{13}$-$\lambda'_{16}$) and reflect other channels or wavelengths. The bandpass filters 108a-108b comprise transmission ports 113a-113b, respectively, wherein the transmission ports 113a-113b are optically coupled to channel filter assembly 132a and channel filter assembly 135b, respectively. The bandpass filters 108a-108b transmit or pass therethrough the channels $\lambda_{13}$-$\lambda_{16}$ (or $\lambda'_{13}$-$\lambda'_{16}$) and reflect other channels or wavelengths. Therefore, only the channels $\lambda_{13}$-$\lambda_{16}$, which are received at the bandpass filter 108a from the reflection port 117a, are directed to the transmission port 113a. Furthermore, the bandpass filter 108b receives the channels $\lambda'_{13}$-$\lambda'_{16}$ from the transmission port 113b and passes only these channels through to the port 117b.

The channel filter assembly 128a comprises the first in a fifth cascaded series 152a of channel filter assemblies 128a, 129a, 130a, 131a. Also, the channel filter assembly 131b comprises the last in a sixth cascaded series 152b of channel filter assemblies 128b, 129b, 130b, 131 b. The channel filter assemblies 128a-128b each transmit or pass therethrough the channel $\lambda_9$ (or $\lambda'_9$) whilst reflecting other channels. The channel filter assemblies 129a-129b each transmit or pass therethrough the channel $\lambda_{10}$ (or $\lambda'_{10}$) whilst reflecting other channels. The channel filter assemblies 130a-130b each transmit or pass therethrough the channel $\lambda_{11}$ (or $\lambda'_{11}$) whilst reflecting other channels. The channel filter assemblies 131a-131b each transmit or passes therethrough the channel $\lambda_{12}$ (or $\lambda'_{12}$) whilst reflecting other channels.

The cascaded series 152a of optically coupled channel filter assemblies 128a, 129a, 130a, 131a operates so as to separate the channels $\lambda_9$-$\lambda_{12}$ to different respective pathways, this separating operation being in a fashion similar to that described in reference to the series 150a or the series 151a. The optical couplings 112g-i route channels amongst the channel filter assemblies comprising the cascaded series 152a. Also, the cascaded series 152b of optically coupled channel filter assemblies 128b, 129b, 130b, 131b operates so as to combine the channels $\lambda'_9$, $\lambda'_{10}$, $\lambda'_{11}$ and $\lambda'_{12}$, this combining operation being in a fashion similar to that described in reference to the series 150b or the series 151b. The optical couplings 112q-s route channels amongst the channel filter assemblies comprising the cascaded series 152b.

The channel filter assembly 132a comprises the first in a cascaded series 153a of channel filter assemblies 132a, 133a, 134a, 135a. Also, the channel filter assembly 135b comprises the last in a cascaded series 153b of channel filter assemblies 132b, 133b, 134b, 135b. The channel filter assemblies 132a-132b each transmit or pass therethrough the channel $\lambda_{13}$ (or $\lambda'{13}$) whilst reflecting other channels. The channel filter assemblies 133a-133b each transmit or pass therethrough the channel $\lambda_{14}$ (or $\lambda'_{14}$) whilst reflecting other channels. The channel filter assemblies 134a-134b each transmit or pass therethrough the channel $\lambda_5$ (or $\lambda'_{15}$) whilst reflecting other channels. The channel filter assemblies 135a-135b each transmit or passes therethrough the channel $\lambda_{16}$ (or $\lambda'_{16}$) whilst reflecting other channels.

The cascaded series 153a of optically coupled channel filter assemblies 132a, 133a, 134a, 135a operates so as to separate the channels $\lambda_{13}$-$\lambda_{16}$ to different respective pathways, this separating operation being in a fashion similar to that described in reference to the series 150a or the series 151a. The optical couplings 112j, 112k and 112m route channels amongst the channel filter assemblies comprising the cascaded series 153a. Also, the cascaded series 153b of optically coupled channel filter assemblies 132b, 133b, 134b, 135b operates so as to combine the channels $\lambda'_{13}$, $\lambda'_{14}$, $\lambda'_{15}$ and $\lambda'_{16}$, this combining operation being in a fashion similar to that described in reference to the series 150b or the series 151b. The optical couplings 112n-p route channels amongst the channel filter assemblies comprising the cascaded series 153b.

Figure 3:
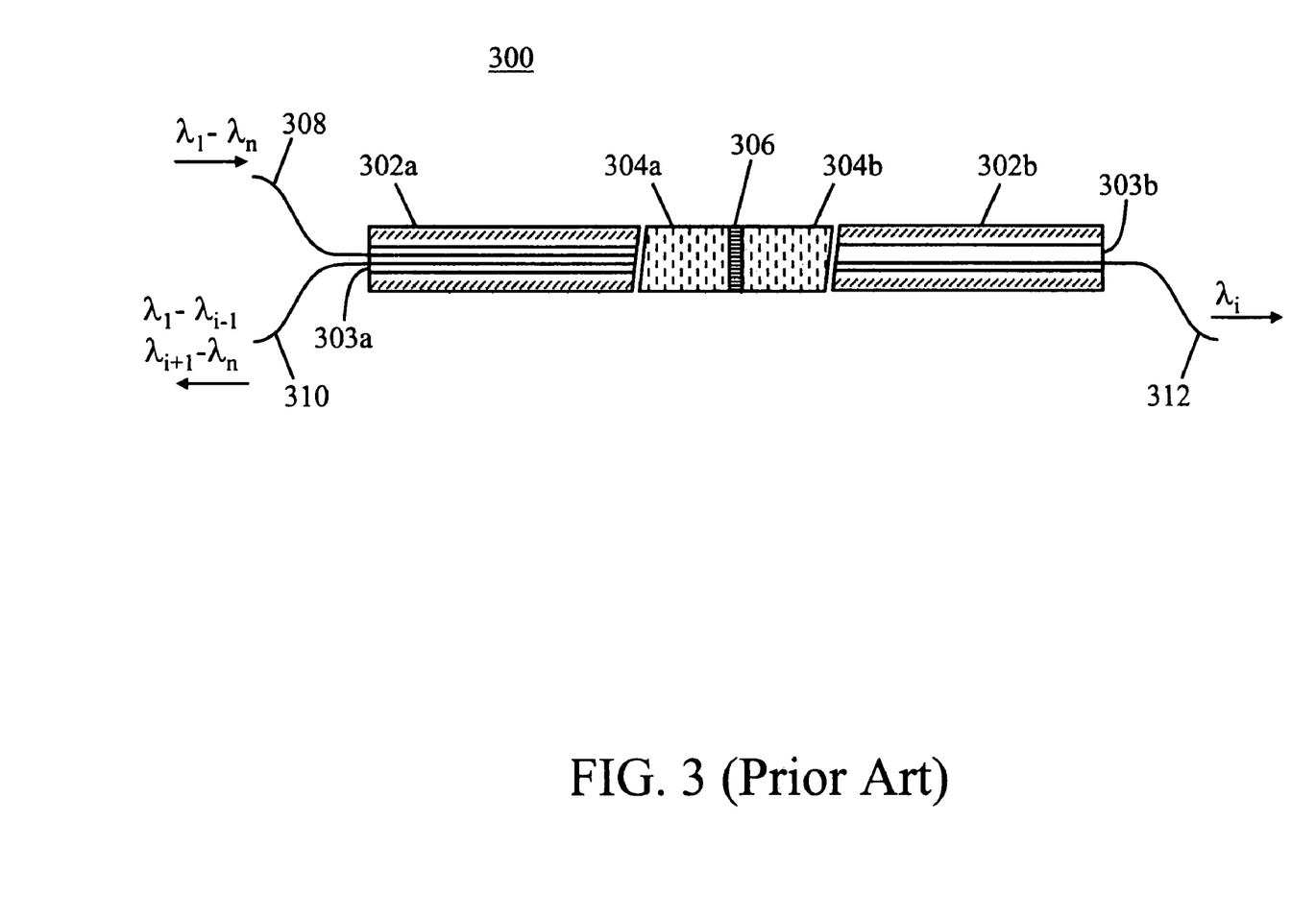
FIG. 3 shows a conventional channel filter assembly which may be used as a component within an embodiment of an OADM in accordance with the present invention.

The channel filter assemblies 120a, 121a, . . . , 135a and 120b, 121b, . . . , 135b may comprise any apparatus capable of performing the illustrated functions of transmitting a certain channel to a reflection port whilst reflecting other channels to a reflection port. FIG. 3 shows an example of a known channel filter assembly which may be used as a component within an embodiment of an OADM in accordance with the present invention. The channel filter assembly 300 shown in FIG. 3 comprises a first capillary tube 302a (or other similar supporting or housing mechanism) comprising a hollow bore 303a and a second capillary tube 302b (or other similar supporting or housing mechanism) comprising a hollow bore 303b. The hollow bore 303a of the first capillary tube 302a is of an appropriate diameter so as to house a first fiber 308 and a second fiber 310. The hollow bore 303b of the second capillary tube 302b houses at least a third fiber 312. The first fiber 308 and second fiber 310 are optically coupled to a first one-quarter pitch GRIN lens 304a whilst the third fiber is optically coupled to a second one-quarter pitch GRIN lens 304b. An optical filter 306, which may comprise a thin-film filter, is optically coupled between the first GRIN lens 304a and the second GRIN lens 304b. The optical filter 306 (FIG. 3) comprises a pass band width that is sufficiently narrow such that only one selected channel $\lambda_1$ is transmitted from the first GRIN lens 304a through the filter 306 to the second GRIN lens 304b, or from the second GRIN lens 304b through the filter 306 to the first GRIN lens 304a. Other channels that are not transmitted through the filter 306 are reflected at the filter 306.

In the general operation of the channel filter assembly 300, a composite optical signal input from the first fiber 308 and comprising the n channels $\lambda_1$-$\lambda_n$ is collimated by the first quarter-pitch GRIN lens 304a and is directed as a collimated beam to the filter 306. It is assumed for purposes of this example that the filter 306 only transmits the single channel $\lambda_i$ (wherein 1<i<n). Therefore, only the channel $\lambda_1$ passes through the filter 306 to the second quarter pitch GRIN lens 304b. This second GRIN lens 304b focuses the light comprising the single channel $\lambda_1$ into the end of the third fiber 312. The remaining channels $\lambda_1$-$\lambda_{i-1}$ and $\lambda_{i+1}$-$\lambda_n$ are reflected at the filter 306 back to the GRIN lens 304a, from which they are focused into the end of the second fiber 310. Thus, the third fiber 312, comprising a transmission port, carries only the single channel $\lambda_i$ out of the channel filter assembly 300 whilst the second fiber 310, comprising a reflection port, carries the remaining channels $\lambda_1$-$\lambda_{i-1}$ and $\lambda_{i+1}$-$\lambda_n$ out of the channel filter assembly 300.

The choice of the channel $\lambda_i$ transmitted by the filter assembly 300 is determined by the pass band characteristics of the filter 306. Thus, the channel filter assembly 300 may serve as any of the channel filter assemblies 120a, 121a, 122a, . . . , 135a in the OADM 100 or the OADM 200. Further, it should be clear to one of ordinary skill in the art that the channels could propagate through the filter assembly 300 in the opposite direction to the pathways illustrated in FIG. 3, with the result that that channel filter assembly 300 would then combine the channel $\lambda_i$ together with the other channels $\lambda_1$-$\lambda_{i-1}$ and $\lambda_{i+1}$-$\lambda_n$. As a result, the channel filter assembly 300 may also serve as any of the channel filter assemblies 120b, 121b, 122b, . . . , 135b in the OADM 100 or the OADM 200.

The OADM 200 (FIG. 2) comprises an upgrade of or extension to the OADM 100 (FIG. 1). Simple inspection of FIGS. 1 and 2, taken in conjunction with the operating principles discussed, will indicate that, regardless of how an OADM in accordance with the present invention is upgraded to accommodate additional channels, no channel ever passes through—that is, transmitted through—more than two optical filters in series. Each channel passes through exactly one bandpass filter and one additional filter within a channel filter assembly and is otherwise reflected from or at any other filters it may encounter. This is important because transmission through an optical filter generally results in greater signal loss than does reflection from the same filter. Such losses are known as insertion losses. Insertion losses may result from incomplete transmission of a channel through a filter at which the channel is nominally transmitted or incomplete reflection of the channel from a filter at which the channel is nominally reflected. Each filter has an insertion loss associated with it and the total insertion loss (in logarithmic units) is the summation of the insertion loss introduced at each component. Furthermore, because transmission through an optical filter narrows the spectrum of a channel transmitted through the filter, transmission through multiple filters in succession undesirably narrows the channel's pass band.

Figure 4:
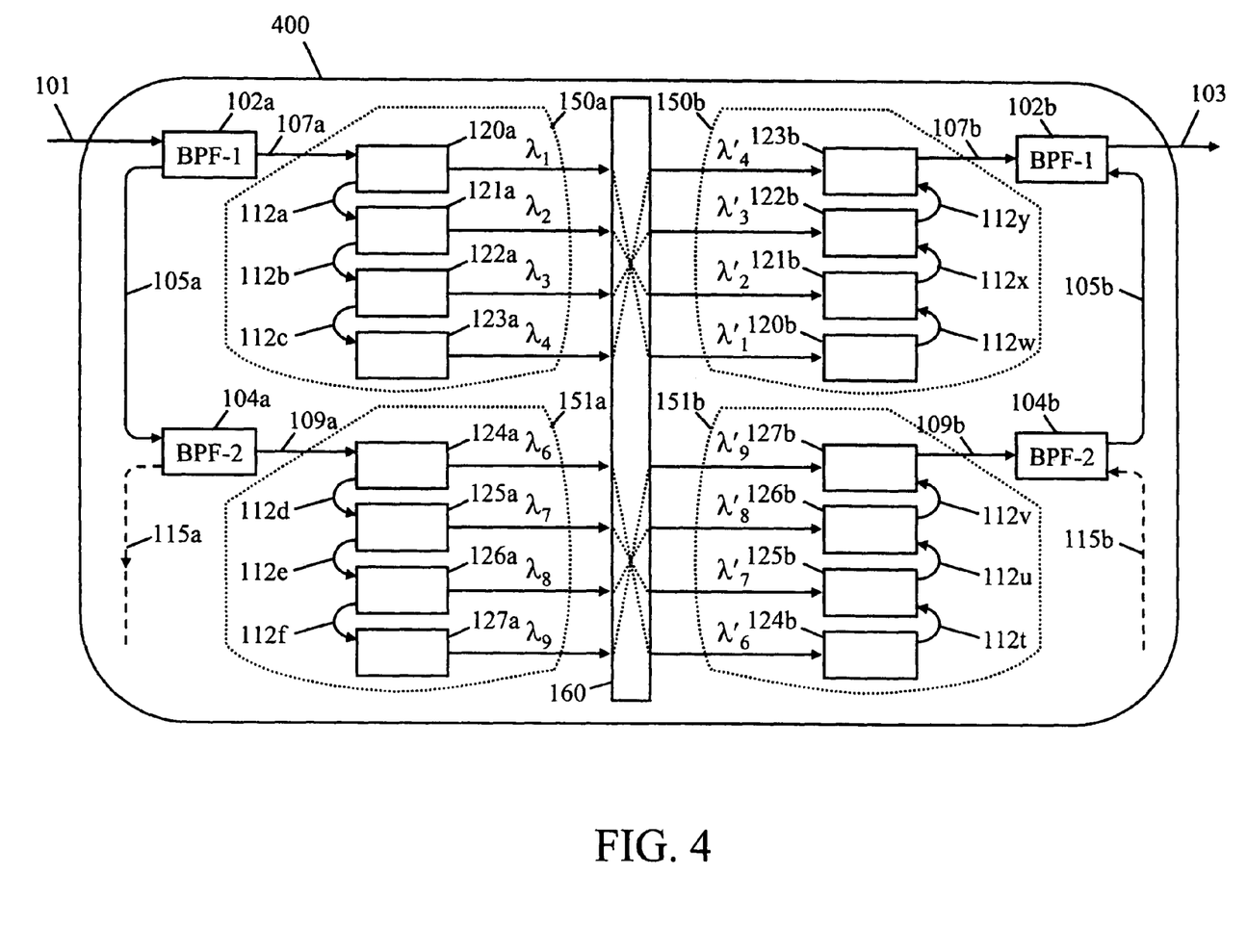
FIG. 4 illustrates a third preferred embodiment of an OADM in accordance with the present invention.

FIG. 4 illustrates an alternative embodiment of an OADM in accordance with the present invention. The OADM 400 shown in FIG. 4 is identical to the OADM 100 shown in FIG. 1 except that there is no channel utilized between the set of channels transmitted to the transmission port 107a and the set of channels reflected to the reflection port 105a by the bandpass filter 102a. Stated in another fashion, only the channels $\lambda_1$-$\lambda_4$ and $\lambda_6$-$\lambda_9$ are employed and the wavelength that would normally correspond to the fifth channel, $\lambda_5$, remains unutilized for optical signal transmission. Similarly, there is no added channel $\lambda'_5$.

The OADM 400 may be utilized when the edges of the pass band or transmission band of the bandpass filter 102a are insufficiently steep to provide adequate separation between the wavelengths corresponding to two adjacent channels, such as between the wavelengths corresponding to $\lambda_4$ and $\lambda_5$ ($\lambda'_4$ and $\lambda'_5$) or $\lambda_5$ and $\lambda_6$ ($\lambda'_5$ and $\lambda'_6$) In such a situation, the channel $\lambda_5$, if utilized, would be partially transmitted by the bandpass filter 102a to the transmission port 107a and partially reflected to the reflection port 105a. To avoid such an undesirable situation, the $\lambda_5$ wavelength is not utilized and the spacing between $\lambda_4$ and $\lambda_6$ is substantially double that between $\lambda_1$ and $\lambda_2$, between $\lambda_2$ and $\lambda_3$, etc. This relaxes the performance constraints on the filters 102a-102b while still permitting a total of eight channels ($\lambda_1$-$\lambda_4$ and $\lambda_6$-$\lambda_9$ or $\lambda'_1$-$\lambda'_4$ and $\lambda_6$-$\lambda'_9$) to be routed into and out of the OADM 400.

An improved upgradeable OADM has been disclosed. An OADM in accordance with the present invention comprises an optical input; an optical output; a first and a second bandpass filter, comprising a first pass band, optically coupled to the optical input and the optical output, respectively; a third and a fourth bandpass filter, comprising a second pass band, optically coupled to reflection ports of the first and second bandpass filters, respectively; a first and a second cascaded series of channel filter assemblies optically coupled to the transmission ports of the first and second bandpass filters, respectively and a third and a fourth cascaded series of channel filter assemblies optically coupled to the transmission ports of the third and fourth bandpass filters, respectively. The first and third bandpass filters comprise a first cascaded series of bandpass filters. The second and fourth bandpass filters comprise a second cascaded series of bandpass filters. An OADM in accordance with the present invention may be extended or upgraded so as to accommodate the throughput of additional channels or wavelengths by extending the number of filters within each cascaded series of bandpass filters, wherein the transmission ports of the additional bandpass filters are optically coupled to respective additional cascaded series of channel filter assemblies.

Although the present invention has been disclosed in accordance with the embodiments shown, one of ordinary skill in the art will readily recognize that there could be variations to the embodiments and those variations would be within the spirit and scope of the present invention. For instance, within the OADM 100, the positions of the bandpass filter 102a and the series 150a could be interchanged with those of the bandpass filter 104a and the series 151a, respectively, without changing the basic functionality of the apparatus. Also, the positions of the bandpass filter 102b and the series 150b could be interchanged with those of the bandpass filter 104b and the series 151b, respectively. Many other similar such positional interchanges could be performed within the OADM 200, but, in all such cases, the resulting apparatuses would be functionally equivalent to the apparatuses described herein. Accordingly, many modifications may be made by one of ordinary skill in the art without departing from the spirit and scope of the appended claims.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. An upgradeable optical add/drop module, comprising:
an optical input and an optical output;
a first bandpass filter with a first pass band and optically coupled to the optical input, comprising a first reflection port and a first transmission port;
a second bandpass filter with the first pass band and optically coupled to the optical output, comprising a second reflection port and a second transmission port;
a third bandpass filter with a second pass band and optically coupled to the first reflection port, comprising a third transmission port and a third reflection port, wherein the third reflection port is configured to be connectable to a further bandpass filter in order to accommodate a plurality of additional channels;

a fourth bandpass filter with the second pass band and optically coupled to the second reflection port, comprising a fourth transmission port and a fourth reflection port, wherein the fourth reflection port is configured to be connectable to a further bandpass filter in order to accommodate a plurality of additional channels;

a first cascaded series of channel filter assemblies optically coupled to the first transmission port;

a second cascaded series of channel filter assemblies optically coupled to the second transmission port;

a third cascaded series of channel filter assemblies optically coupled to the third transmission port; and a fourth cascaded series of channel filter assemblies optically coupled to the fourth transmission port.

2. The module of claim 1, further comprising an optical switching unit optically coupled between the first and second cascaded series of channel filter assemblies, and between the third and fourth cascaded series of channel filter assemblies.

3. The module of claim 1, wherein the first bandpass filter, the first cascaded series of channel filter assemblies, the third bandpass filter, and the third cascaded series of channel filter assemblies comprise a de-multiplexer section of the module.

4. The module of claim 3, wherein the first bandpass filter separates a composite optical input signal into a first subset of channels and a second subset of channels, wherein the first subset of channels is transmitted to the first cascaded series of channel filter assemblies via the first transmission port and the second subset of channels is reflected to the third bandpass filter via the first reflection port.

5. The module of claim 4, wherein each assembly in the first cascaded series of channel filter assemblies transmits one channel of the first subset of channels and reflects other channels of the first subset of channels.

6. The module of claim 4, wherein the third bandpass filter separates the second subset of channels into a third subset of channels and a fourth subset of channels, wherein the third subset of channels is transmitted to the third cascaded series of channel filter assemblies via the third transmission port and the fourth subset of channels is reflected from the third bandpass filter.

7. The module of claim 6, wherein each assembly in the third cascaded series of channel filter assemblies transmits one channel of the third subset of channels and reflects other channels of the third subset of channels.

8. The module of claim 6, wherein the second bandpass filter, the second cascaded series of channel filter assemblies, the fourth bandpass filter, and the fourth cascaded series of channel filter assemblies comprise a multiplexer section of the module.

9. The module of claim 8, wherein each channel of the first subset of channels is transmitted to an assembly of the second cascaded series of channel filter assemblies, wherein the second cascaded series of channel filter assemblies transmit the first subset of channels to the second bandpass filter via the second transmission port.

10. The module of claim 9, wherein each assembly in the second cascaded series of channel filter assemblies transmit one channel of the first subset of channels and reflects other channels of the first subset of channels.

11. The module of claim 9, wherein each channel of the third subset of channels is transmitted to an assembly of the fourth cascaded series of channel filter assemblies, wherein the fourth cascaded series of channel filter assemblies transmit the third subset of channels to the fourth bandpass filter via the fourth transmission port.

12. The module of claim 11, wherein each assembly in the fourth cascaded series of channel filter assemblies transmit one channel of the third subset of channels and reflects other channels of the third subset of channels.

13. The module of claim 11, wherein the fourth bandpass filter combines the third subset of channels, wherein the third subset of channels is transmitted to the second bandpass filter via the second reflection port.

14. The module of claim 13, wherein the second bandpass filter transmits the first subset of channels and reflects the third subset of channels, wherein the first and third subsets of channels are combined into a composite optical output signal.

15. The module of claim 1, wherein at least one of the channel filter assemblies comprises:

a first capillary tube comprising a plurality of optical fibers;

a second capillary tube comprising at least one optical fiber;

a first quarter pitch GRIN lens optically coupled to the first capillary tube;

a second quarter pitch GRIN lens optically coupled to the second capillary tube; and an optical fiber optically coupled to the first and second GRIN lenses.

16. A system, comprising:

a composite optical input signal; and an optical add/drop module, comprising:

an optical input and an optical output, a first bandpass filter with a first pass band and optically coupled to the optical input, comprising a first reflection port and a first transmission port, a second bandpass filter with the first pass band and optically coupled to the optical output, comprising a second reflection port and a second transmission port, a third bandpass filter with a second pass band and optically coupled to the first reflection port, comprising a third transmission port, a fourth bandpass filter with the second pass band and optically coupled to the second reflection port, comprising a fourth transmission port, a first cascaded series of channel filter assemblies optically coupled to the first transmission port, a second cascaded series of channel filter assemblies optically coupled to the second transmission port, a third cascaded series of channel filter assemblies optically coupled to the third transmission port, a fourth cascaded series of channel filter assemblies optically coupled to the fourth transmission port, and an optical switching unit optically coupled between the first and second cascaded series of channel filter assemblies, and between the third and fourth cascaded series of channel filter assemblies.

17. The system of claim 16, wherein the optical switching unit is configured to transmit a plurality of channels from the first cascaded series of channel filter assemblies to the second cascaded series of channel filter assemblies in a selected order.

18. The system of claim 17, wherein the selected order is a reverse order sequence.

* * * * *